United States Patent [19]

Handtmann et al.

[11] 4,040,740
[45] Aug. 9, 1977

[54] OPTO-ELECTRONIC SENSOR

[75] Inventors: Dieter Handtmann, Sindelfingen, Germany; Jean-Pierre Lavanchy, Neuchatel, Switzerland

[73] Assignee: Robert Bosch GmbH, Stuttgart, Germany

[21] Appl. No.: 582,137

[22] Filed: May 30, 1975

[30] Foreign Application Priority Data

July 2, 1974 Germany ............................ 2431630

[51] Int. Cl.² .............................................. G01C 3/08
[52] U.S. Cl. ........................................ 356/4; 250/205
[58] Field of Search .................. 356/1, 4, 5, 141, 152; 250/205

[56] References Cited

U.S. PATENT DOCUMENTS

| 2,206,036 | 7/1940 | Herson | 343/12 A |
|---|---|---|---|
| 2,489,220 | 11/1949 | Herbold | 356/1 |
| 3,679,307 | 7/1972 | Zoot et al. | 356/4 |
| 3,778,157 | 12/1973 | Brelot et al. | 356/4 |
| 3,802,780 | 4/1974 | Helm et al. | 356/5 |
| 3,815,994 | 6/1974 | Peckham | 356/5 |
| 3,885,872 | 5/1975 | Howe, Jr. et al. | 356/4 |

Primary Examiner—Maynard R. Wilbur
Assistant Examiner—S. C. Buczinski
Attorney, Agent, or Firm—Edwin E. Greigg

[57] ABSTRACT

An instrument for giving electrical indications of the distance between two reference points includes a light source, a primary light-sensitive detector and a secondary light-sensitive control detector. Both detectors may be photodiodes. In one embodiment, the light from the source is reflected from a reference plane and is intercepted by the primary detector and by the secondary control detector. The secondary control detector is part of a control loop which adjusts the intensity of the light source in such a manner that the photo current through the secondary control detector remains constant, thus providing compensation for changes in brightness and sensitivity due to aging, soiling and other influences.

9 Claims, 3 Drawing Figures

OPTO-ELECTRONIC SENSOR

BACKGROUND OF THE INVENTION

The invention relates to an opto-electronic sensor for contact-less measurement of the distance between two reference points. The sensor includes a light source and a light-sensitive detector actuated by emissions from the light source.

It is already known to measure the distance between two reference points in contact-less manner by means of opto-electronic sensors. However, the known sensors lack response uniformity over long periods of time. This fact is due to aging, temperature changes and soiling of the light-sensitive electronic elements and of the light source itself.

OBJECT AND SUMMARY OF THE INVENTION

It is a principal object of the invention to provide an opto-electronic sensor of the type described above in which the response remains uniform, independently of time.

It is also an object of the invention to provide a sensor which determines the distance between reference points by reflection of light or, alternatively, by transmission of light and which includes means for adjusting the light source intensity so as to compensate for effects due to aging and soiling.

These objects are attained according to the invention by providing the light sensor with a secondary light-sensitive detector which is part of a control loop that regulates the intensity of the light source so that a predetermined, in particular a constant, photo current flows through the light-sensitive control detector.

It is an advantageous feature of the invention, that the primary detector and the control detector are photodiodes and the photodiode used as the control detector is included in an electric control loop containing an operational amplifier. The non-inverting input of the operational amplifier is connected through a resistor to ground and its inverting input is connected to the summation junction of one electrode of the photodiode, the other electrode of which is connected to positive supply voltage, of a resistor and of a trimmer resistor which is connected to the negative supply voltage. The output of the operational amplifier is connected to the base of a transistor whose collector is connected, in series with the light source, to the positive supply voltage and whose emitter is connected, in series with a resistor, to ground.

In a first, preferred, embodiment of the invention, the distance between two reference points may be measured by optical reflection. The light-sensitive primary detector and the light sensitive control detector are disposed adjacent to one another and are so located that they lie in the area illuminated by light reflected from a reference surface which contains one of the reference points. The material used for the reference surface preferably has reflectance characteristics which conform to the Lambert cosine law.

Another preferred feature of the invention provides that the reference surface material is $Al_2O_3$ ceramic and that it is provided with darkened structures, produced especially by laser beams.

A further, advantageous, feature of the invention is that the light source may be a light-emitting diode.

Alternatively, the light source may also, advantageously, be a miniature incandescent lamp whose light is guided to the reference plane by a light conductor.

The invention will be better understood as well as further objects and advantages thereof will become more apparent from the ensuing detailed specification of two exemplary embodiments taken in conjunction with the drawing.

DESCRIPTION OF THE PREFERRED EMBODIMENTS

Figure 1:
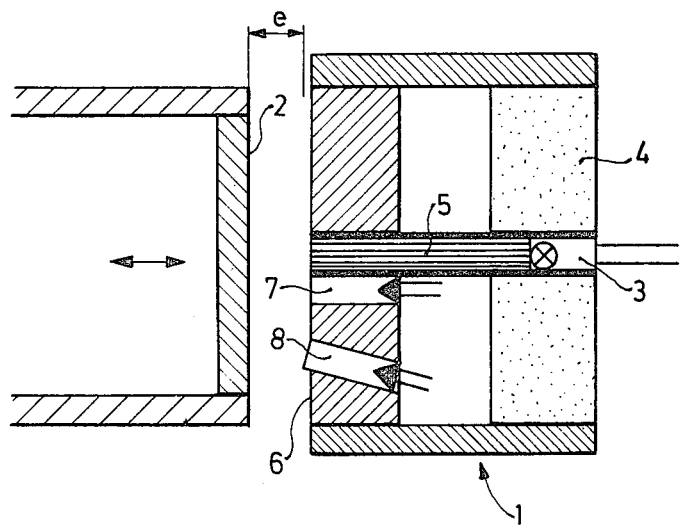
FIG. 1 is a diagram of a first exemplary embodiment of the opto-electronic sensor according to the invention.

The opto-electronic sensor shown in FIG. 1 is formed by a pickup element 1 and a reference plane 2. The pickup element 1 contains a light source 3 which may be a miniature incandescent lamp or a light emitting diode. A resilient bearing material 4, in which the light source 3 is embedded, imparts resistance to shock. The light emitted by the light source 3 is conducted to the front face 6 of the sensing element 1 by a light conductor 5 (fiber bundle). Located within the front face 6 of the sensing element 1 is a light-sensitive primary detector 7 and light-sensitive control detector 8. Both light-sensitive detectors may, preferably, be photodiodes.

The method of operation of the opto-electronic sensor shown in FIG. 1 is as follows:

The distance between two reference points is measured by optical reflectance: the light emerging from the light conductor 5 is reflected by the reference plane 2 which contains one of the reference points. The reflected light impinges on the light-sensitive primary detector and on the light-sensitive control detector and produces therein photo currents $i_{ph}$. The photo current produced within the light-sensitive primary detector 7 is an analog measure of the distance between the two reference points. Since it is suitable to operate the instrument with zero suppression, the second reference point is advantageously located exteriorly of the front face 6 of the pickup element 1. The light sensitive control detector 8 is used to so control the intensity of the light source 3 that a constant photo current $I_{pH}$ always flows through the control detector. This regulation compensates for any fluctuation of the light-generating efficiency of the light source, for the sensitivity of the photodiodes, provided they both change in the same manner, and for changes of the reflectance property of the reference plane 2.

When using a miniature incandescent lamp as a light source 3, the light conductor 5 offers the advantage that the spatial and thermal isolation which it permits prevents heat loading of the photodiodes 7 and 8.

By changing the locations of the light source 3 and of the photodiodes 7 and 8, different types of characteristic behavior may be obtained.

It is advantageous to provide the reference plane 2 with a surface material which obeys the Lambert cosine law, for example alumina ($Al_2O_3$). In that case, the opto-electronic sensor is less dependent on tilting and inclinations of the reference plane. The calibration of the sensor may be performed by making the space at the back of the reference plane 2 into a hollow, black space. For example, laser beams may be used to create holes in the reference plane. During the calibration process, the inner concentric regions of the reference plane are used for small distances and the outer regions are used for larger distances.

Figure 2:
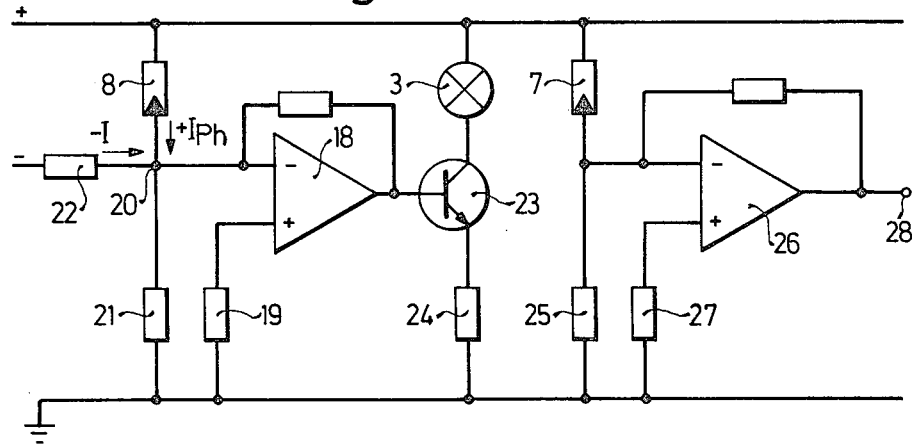
FIG. 2 is a circuit diagram of the electronic control circuit used in the sensor according to the invention.

FIG. 2 is an electric circuit diagram of the embodiment according to FIG. 1. The light-sensitive control detector 8, embodied as a photodiode 8, is disposed in an electric control loop containing an operational amplifier 18 whose non-inverting input is connected to ground in series with a resistor 19 and whose inverting input is connected to the summation point 20 of the photodiode 8, a resistor 21 and a trimming resistor 22, connected to the negative voltage supply terminal. The output of the operational amplifier 18 is fed to the base of a transistor 23 whose collector is connected, in series with the light source 3, to the positive supply terminal and whose emitter is connected to ground via a resistor 24. The operating potential may be supplied, for example, by a battery.

The photodiode 7 which acts as the light-sensitive primary detector acts as a current source for the inverting input of a second operational amplifier 26. The non-inverting input of the operational amplifier 26 is connected to ground in series with a resistor 27. The output 28 of the operational amplifier 26 carries a voltage which may be used as an analog measure of the distance between two reference points and may be displayed on a visually indicating instrument (not shown).

Figure 3:
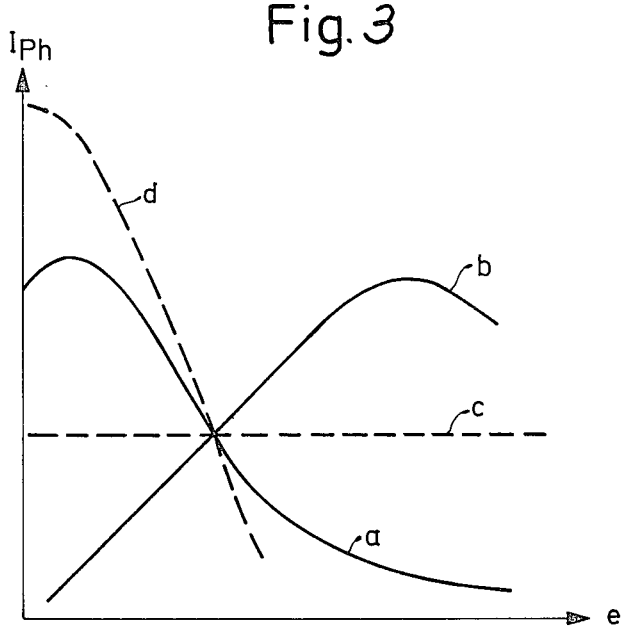
FIG. 3 is a diagram showing the photo current through the light sensitive primary detector and through the control detector as a function of the distance between the two reference points.

The diagram of FIG. 3 shows the behavior of the photo current $I_{pH}$ as a function of the distance $e$ between two reference points in the apparatus according to FIG. 1. If the light source 3 would emit light of constant intensity, then the light-sensitive primary detector 7 would carry the photo current shown in the curve $a$ whereas the light-sensitive control detector 8 would carry the photo current shown by the curve $b$. However, if the light source 3 is so controlled that the photo current $+I_{Ph}$ flowing through the photodiode 8 is constant, as suggested by the broken line $c$, then the photodiode 7 carries a photo current indicated by the characteristic curve $d$. The curve $d$ is obtained by dividing the characteristic curve $a$ by the curve $b$. The magnitude of the constant photo current $+I_{Ph}$ flowing through the photodiode 8 may be set by changing the negative supply voltage and by adjusting the trimmer resistor 22.

The opto-electronic sensor according to the invention offers the advantage of permitting contact-less and rapid measurements of the distance between two reference points in widely different situations and without being subject to the effects of wear or aging.

Furthermore, the sensor is independent of rapidly fluctuating magnetic fields, for example, those due to electric motors, and it is stable over long periods of time. Thus, for example, this opto-electronic sensor is suitable to give contact-less indications of the position of an air flow measuring member, located in the induction tube of an internal combustion engine, the position of which corresponds to the flow rate of the air aspirated by the engine.

What is claimed is:

1. An apparatus for measuring the distance between first and second reference points, comprising; in combination:
  A. a frame defining said first reference point;
  B. a reflective reference surface defining said second reference point, movably associated with said frame;
  C. a source of light fixed in said frame for directing light toward said reference surface;
  D. a first light detector, fixed in said frame immediately adjacent to said light source for detecting primarily light which is retro-reflected from said reference surface and generating a first detector signal;
  E. a second light detector, fixed in said frame at a lateral distance from said light source and from said first light detector, for detecting primarily light which has been angularly reflected by said reference surface and for generating a control signal;
  F. circuit means, connected to said second light detector and to said source of light for so controlling the intensity of light provided by said source of light that said control signal from said secondary control detector remains substantially constant;
  whereby the magnitude of said first signal is independent of change in the coefficient of reflectance of said reflecting surface.

2. An apparatus as defined in claim 1, wherein said first light detector and said second light detector are photodiodes.

3. An apparatus as defined in claim 2, wherein one electrode of said second light detector is connected to a source of positive potential and wherein said circuit means includes:
  a. a first resistor, one electrode of which is connected to electrical ground;
  b. a second, adjustable resistor, one electrode of which is connected to a source of negative potential;
  c. an operational amplifier whose inverting input is connected to the junction of the second electrode of each of said first resistor, said second resistor and said second light detector, and whose non-inverting input is connected to ground via a third resistor; and
  d. first transistor means whose base is connected to the output of said operational amplifier, whose collector is connected in series with said source of light to said positive potential and whose emitter is connected to ground via a fourth resistor.

4. An apparatus as defined in claim 1, wherein said source of illumination is a light-emitting diode.

5. An opto-electronic sensor as defined in claim 1, wherein said source of light is an incandescent lamp equipped with light conducting means for guiding the light to said reference surface.

6. An apparatus as defined in claim 1, wherein said reference surface exhibits reflectance properties conforming to the Lambert cosine law.

7. An apparatus as defined in claim 6, wherein said reference surface consists of alumina ($Al_2O_3$).

8. An apparatus as defined by claim 1, wherein said first detector and said second detector are substantially at equal perpendicular distances from said reference surface.

9. An apparatus as defined by claim 8, including means for limiting the angular response of said first and second detectors to respective light beams having different spatial directions.

* * * * *